(12) United States Patent
Suzuki et al.

(10) Patent No.: US 11,734,987 B2
(45) Date of Patent: Aug. 22, 2023

(54) VENDING MACHINE CONTROL SYSTEM, VENDING MACHINE, AND INFORMATION OUTPUT METHOD

(71) Applicant: Rakuten Group, Inc., Tokyo (JP)

(72) Inventors: Ryosuke Suzuki, Tokyo (JP); Asako Kudo, Tokyo (JP); Satoru Yoshida, Tokyo (JP)

(73) Assignee: Rakuten Group, Inc., Tokyo (JP)

(*) Notice: Subject to any disclaimer, the term of this patent is extended or adjusted under 35 U.S.C. 154(b) by 193 days.

(21) Appl. No.: 17/299,910

(22) PCT Filed: Jul. 28, 2020

(86) PCT No.: PCT/JP2020/028846
§ 371 (c)(1),
(2) Date: Jun. 4, 2021

(87) PCT Pub. No.: WO2022/024209
PCT Pub. Date: Feb. 3, 2022

(65) Prior Publication Data
US 2022/0309858 A1    Sep. 29, 2022

(51) Int. Cl.
G06Q 20/18       (2012.01)
G07F 17/00       (2006.01)
B65G 1/04        (2006.01)

(52) U.S. Cl.
CPC ....... *G07F 17/0014* (2013.01); *B65G 1/0485* (2013.01); *G06Q 20/18* (2013.01); *B65G 2203/0216* (2013.01)

(58) Field of Classification Search
CPC .......... G07F 9/002; G07F 9/006; G07F 9/026; G06Q 20/18
See application file for complete search history.

(56) References Cited

U.S. PATENT DOCUMENTS

| | | | |
|---|---|---|---|
| 2008/0125906 A1* | 5/2008 | Bates ................ | G06Q 30/0641 700/241 |
| 2012/0029691 A1* | 2/2012 | Mockus ................ | G07F 9/023 700/231 |
| 2014/0316561 A1 | 10/2014 | Tkachenko et al. | |

(Continued)

FOREIGN PATENT DOCUMENTS

| | | |
|---|---|---|
| JP | 2-187892 A | 7/1990 |
| JP | 2005-25687 A | 1/2005 |
| JP | 2013-125490 A | 6/2013 |

OTHER PUBLICATIONS

English translation of the concise explanation of relevance.
International Search Report for PCT/JP2020/028846 dated Oct. 6, 2020 [PCT/ISA/210].

*Primary Examiner* — Timothy R Waggoner
(74) *Attorney, Agent, or Firm* — Sughrue Mion, PLLC

(57) ABSTRACT

The vending machine control system S performs authentication processing for authenticating a user on the basis of information on the user who is about to open a door 13 of a vending machine 1, and when the user is authenticated, performs control to unlock the door 13 of the vending machine 1. Then, the vending machine control system S identifies a product picked up from a storing chamber 12 after the door 13 is unlocked, and when a reserved product is included in the identified product, outputs different information depending on whether or not the authenticated user is a reservation person of the reserved product.

15 Claims, 10 Drawing Sheets

DISPLAY EXAMPLE OF PRODUCT INFORMATION FOR PERSON OTHER THAN RESERVATION PERSON

LIST OF PICKED-UP PRODUCTS

| PRODUCT NAME | SELLING PRICE (UNIT PRICE) | QUANTITY | SUBTOTAL |
|---|---|---|---|
| ABC | 330 | 1 | 330 |
| XYZ | 450 | 2 | 900 |
| STU | 1,500 | 1 | 1,500 |
| FGV | THIS PRODUCT CANNOT BE PURCHASED. RETURN IT TO VENDING MACHINE. | | |
| T & R | 500 | 1 | 500 |
| TOTAL | | | — |

(56) References Cited

U.S. PATENT DOCUMENTS

2014/0316875 A1\* 10/2014 Tkachenko ............. G07F 9/002
           705/14.25
2020/0019949 A1\* 1/2020 Simmons ............. G06Q 10/087

\* cited by examiner

FIG. 2
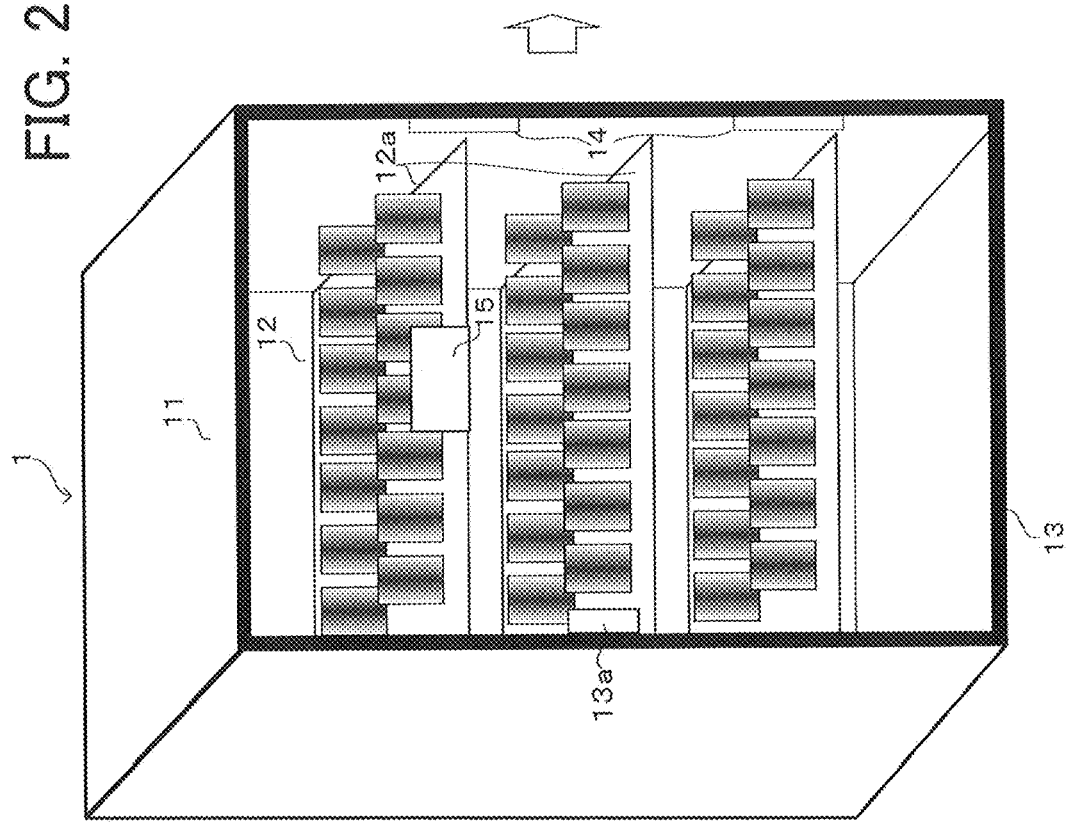
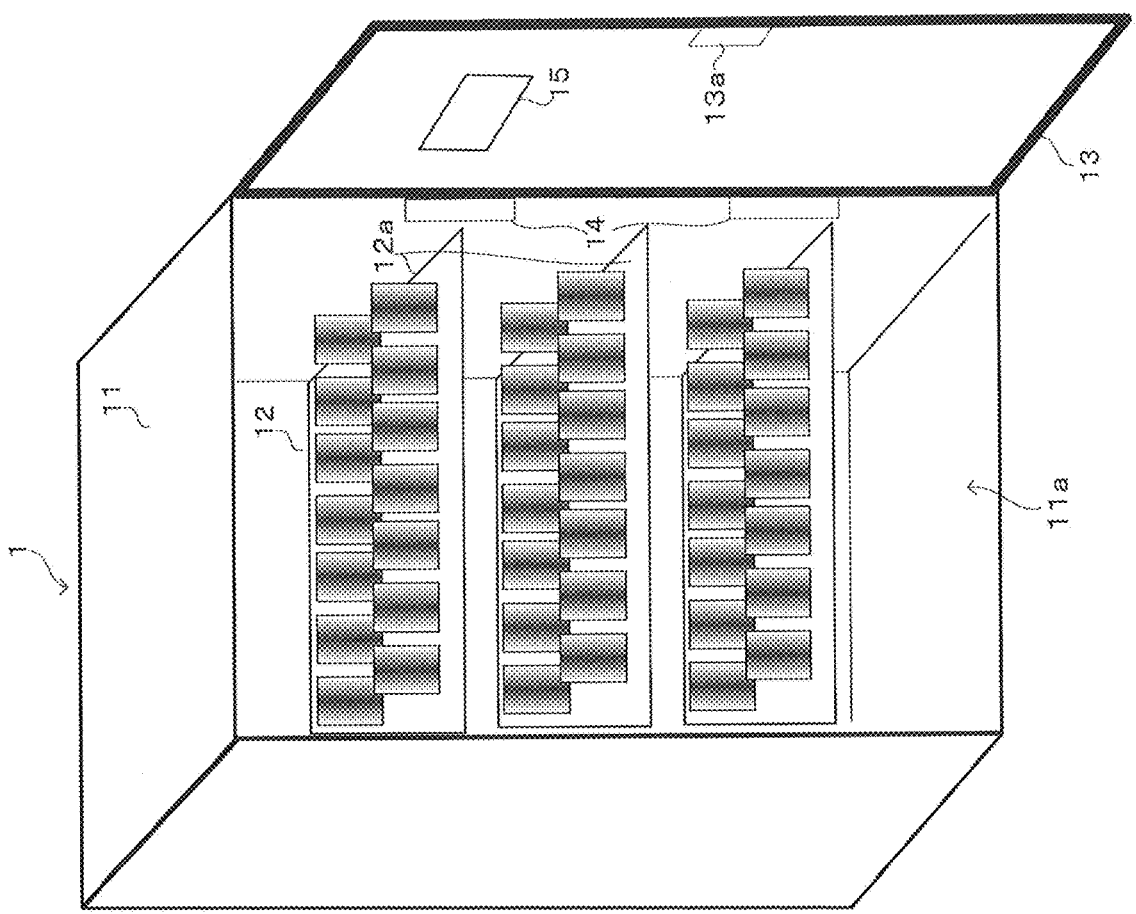

FIG. 5

DISPLAY EXAMPLE OF PRODUCT INFORMATION
FOR RESERVATION PERSON

| | PRODUCT NAME | SELLING PRICE (UNIT PRICE) | QUANTITY | SUBTOTAL |
|---|---|---|---|---|
| I1 | ABC (RESERVED) | 0 | 1 | 0 |
| I2 | XYZ | 450 | 2 | 900 |
| I3 | STU | 1,500 | 1 | 1,500 |
| I4 | FGV (RESERVED) | 0 | 2 | 0 |
| I5 | T&R | 500 | 1 | 500 |
| | | | TOTAL | 2,900 |

LIST OF PICKED-UP PRODUCTS

FIG. 6

DISPLAY EXAMPLE OF PRODUCT INFORMATION
FOR PERSON OTHER THAN RESERVATION PERSON

LIST OF PICKED-UP PRODUCTS

| | PRODUCT NAME | SELLING PRICE (UNIT PRICE) | QUANTITY | SUBTOTAL |
|---|---|---|---|---|
| I1 | ABC | 330 | 1 | 330 |
| I2 | XYZ | 450 | 2 | 900 |
| I3 | STU | 1,500 | 1 | 1,500 |
| I4 | FGV | THIS PRODUCT CANNOT BE PURCHASED. RETURN IT TO VENDING MACHINE. | | |
| I5 | T&R | 500 | 1 | 500 |
| | | | TOTAL | — |

VENDING MACHINE CONTROL SYSTEM, VENDING MACHINE, AND INFORMATION OUTPUT METHOD

CROSS REFERENCE TO RELATED APPLICATIONS

This application is a National Stage of International Application No. PCT/JP2020/028846 filed Jul. 28, 2020.

TECHNICAL FIELD

The present invention relates to a technical field for controlling a vending machine that stores products including a reserved product that is reserved.

BACKGROUND ART

Conventionally, vending machines that enable a reservation person to reliably receive a reserved product reserved by the reservation person have been studied. Patent Literature 1 discloses a vending machine configured so that a person other than the reservation person cannot access the reserved product reserved by the reservation person. For example, Patent Literature 1 describes that when one reservation is made in a state where there are only two products in the vending machine, sold-out display is performed at a stage where one of the two products is purchased by a person other than the reservation person, and when one reservation is made in a state where there is only one product in the vending machine, sold-out display is performed at this point.

CITATION LIST

Patent Literature

Patent Literature 1: JP 2013-125490 A

SUMMARY OF INVENTION

Technical Problem

However, in a vending machine configured so that a person other than the reservation person can access the reserved product reserved by the reservation person (that is, the reserved product can be picked up), the prior art cannot distinguish the reservation person from the person other than the reservation person and make flexible correspondence.

Therefore, one or more embodiments of the present invention are directed to provide a vending machine control system, a vending machine, and an information output method capable of distinguishing the reservation person from the person other than the reservation person and making flexible correspondence, even in a case where a person other than the reservation person can access the reserved product reserved by the reservation person.

Solution to Problem

In response to the above issue, the invention according to claim 1 is a vending machine control system that controls a vending machine including a storing chamber for storing products including a reserved product that is reserved and a door for covering an open space through which a product is picked up from the storing chamber. The vending machine control system includes: an information acquisition unit that acquires information on a user; an authentication processing unit that performs authentication processing for authenticating the user on the basis of the information acquired by the information acquisition unit; an unlocking control unit that performs control to unlock the door of the vending machine when the user is authenticated; a product identification unit that identifies the product picked up from the storing chamber after the door is unlocked; a determination unit that determines whether or not the reserved product is included in the identified product; and an output unit that outputs, when it is determined that the reserved product is included in the identified product, different information depending on whether or not the authenticated user is a reservation person of the reserved product. This makes it possible to distinguish the reservation person from a person other than the reservation person and make flexible correspondence, even in a case where the person other than the reservation person can access the reserved product reserved by the reservation person.

The invention according to claim 2 is the vending machine control system according to claim 1, wherein when the authenticated user is the reservation person of the reserved product, the output unit outputs information indicating that settlement of the reserved product has been completed. This makes it possible to make the user effectively understand that the product picked up by the user is the reserved product of the user and the settlement is completed.

The invention according to claim 3 is the vending machine control system according to claim 1, wherein when the authenticated user is the reservation person of the reserved product, the output unit outputs information indicating zero as a price of the reserved product. This makes it possible to make the user effectively understand that the product picked up by the user is the reserved product of the user and the settlement is completed.

The invention according to claim 4 is the vending machine control system according to claim 1, wherein when the authenticated user is a person other than the reservation person of the reserved product, the output unit outputs a normal price as a price of the reserved product. This allows the user to purchase the product, even if the product picked up by the user is a product reserved by another person.

The invention according to claim 5 is the vending machine control system according to claim 1, wherein when the authenticated user is a person other than the reservation person of the reserved product, the output unit outputs warning information indicating that the reserved product cannot be purchased. This makes it possible to make the user effectively understand that the product picked up by the user is a product reserved by another person and cannot be purchased.

The invention according to claim 6 is the vending machine control system according to claim 5, wherein only when a plurality of the same reserved products are stored in the storing chamber and the reserved products are out of stock in the storing chamber when the reserved products are purchased by a person other than the reservation person of the reserved product, the output unit outputs the warning information.

The invention according to claim 7 is the vending machine control system according to any one of claims 1 to 6 including a reservation processing unit that registers, when a reservation request for a product not stored in the storing chamber is received from a terminal used by the user, the product related to the reservation request as a reserved product.

The invention according to claim 8 is the vending machine control system according to claim 7 further including a notification unit that notifies, when the product related to the reservation request is registered as the reserved product, the user of information on a scheduled date and time when the reserved product is stored in the vending machine. As a result, the reservation person can efficiently adjust the schedule for picking up the reserved product in advance.

The invention according to claim 9 is the vending machine control system according to claim 7 or 8, wherein the notification unit notifies, when the product registered as the reserved product is stored in the storing chamber, the user of information indicating that the product is stored in the vending machine. This makes it possible for the reservation person to go timely to pick up the reserved product.

The invention according to claim 10 is the vending machine control system according to claim 9, wherein the notification unit notifies information that allows a person to identify the vending machine in which the product registered as the reserved product is stored. As a result, the user can quickly identify the vending machine that stores the reserved product.

The invention according to claim 11 is the vending machine control system according to claim 9 or 10, wherein the notification unit notifies installation location information of the vending machine in which the product registered as the reserved product is stored. As a result, the user can quickly identify the vending machine that stores the reserved product.

The invention according to claim 12 is a vending machine including a storing chamber for storing products including a reserved product that is reserved and a door for covering an open space through which the products are picked up from the storing chamber. The vending machine includes: an information acquisition unit that acquires information on a user; an authentication processing unit that performs authentication processing for authenticating the user on the basis of the information acquired by the information acquisition unit; an unlocking control unit that performs control to unlock the door of the vending machine when the user is authenticated; a product identification unit that identifies products picked up from the storing chamber after the door is unlocked; and an output unit that outputs, when the identified products include the reserved product, different information depending on whether or not the authenticated user is a reservation person of the reserved product.

The invention according to claim 13 is an information output method executed by a vending machine including a storing chamber for storing products including a reserved product that is reserved and a door for covering an open space through which the products are picked up from the storing chamber. The information output method includes steps of: acquiring information on a user; performing authentication processing for authenticating the user on the basis of the acquired information; unlocking the door of the vending machine when the user is authenticated; identifying products picked up from the storing chamber after the door is unlocked; and outputting, when the identified products include the reserved product, different information depending on whether or not the authenticated user is a reservation person of the reserved product.

Advantageous Effect of the Invention

According to one or more embodiments of the present invention, it is possible to distinguish the reservation person from a person other than the reservation person and make flexible correspondence, even in a case where the person other than the reservation person can access the reserved product reserved by the reservation person.

BRIEF DESCRIPTION OF DRAWINGS

FIG. 2 illustrates external perspective views of a vending machine 1.

FIG. 5 is a diagram illustrating a display example of product information for a reservation person of a reserved product.

FIG. 6 is a diagram illustrating a display example of product information for a person other than the reservation person of the reserved product.

DESCRIPTION OF EMBODIMENTS

Hereinafter, embodiments of a vending machine control system that controls vending machines will be described with reference to the drawings.

[1. Configuration and Schematic Function of Vending Machine Control System S]

Figure 1:
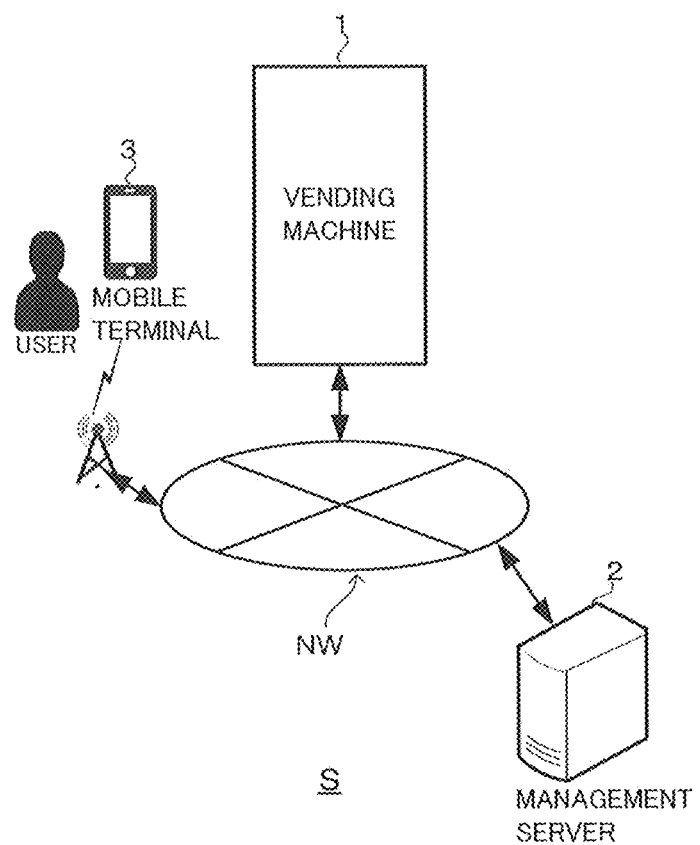
FIG. 1 a diagram illustrating a schematic configuration example of a vending machine control system S according to a present embodiment.

First, the outline of configuration and function of the vending machine control system S according to the present embodiment will be described with reference to FIG. 1 and the like. FIG. 1 is a diagram illustrating a schematic configuration example of the vending machine control system S according to the present embodiment. As illustrated in FIG. 1, the vending machine control system S includes a vending machine 1, a management server 2, and a mobile terminal 3. The vending machine 1 and the mobile terminal 3 can respectively communicate with the management server 2 via a communication network NW. The communication network NW may be composed of, for example, a leased line, the internet, a mobile communication network, or the like.

The mobile terminal 3 is used by a user who uses the vending machine 1. The mobile terminal 3 has a display function for displaying information on a display, a GPS (Global Positioning System) function, a short-range wireless communication function, and the like. The GPS function is a function of acquiring position information (latitude and longitude) of the mobile terminal 3 by using radio waves transmitted from GPS satellites or GNSS (Global Navigation Satellite System) satellites. The near-field communication function is, for example, a short-range wireless communication function based on the Wi-Fi (registered trademark) or Bluetooth (registered trademark) standard. The vending machine 1 is capable of performing the short-range wireless communication with the mobile terminal 3. The mobile terminal 3 stores a user's UID. The mobile terminal 3 is, for example, a smartphone, a mobile phone, a tablet, a mobile game machine, or the like.

Incidentally, the installation location of the vending machine 1 is not particularly limited, but it is installed in, for example, a store or a public facility. In the example of FIG. 1, one vending machine 1 is shown, but a plurality of vending machines 1 may be installed at different locations in one store. Moreover, the management server 2 manages and controls the vending machine 1. In addition, the management server 2 manages an account of the user, performs an authentication process for the user, and performs a settlement process for the product. The management server 2 may be a single server or may be constituted by a plurality of servers. Moreover, the management server 2 may be divided into two servers: one manages and controls the vending machine 1, while the other manages the account of the user, performs the authentication process for the user, and performs the settlement process for the product.

FIG. 2 illustrates external perspective views of the vending machine 1. As illustrated in FIG. 2, the vending machine 1 includes a main body 11 having an open space 11a on the front surface, a storing chamber 12 for storing products, a door 13 for covering the open space 11a through which one or more products are picked up from the storing chamber 12, a hinge mechanism (not illustrated) that connects the main body 11 and the door 13, a lock/unlock mechanism (not illustrated) that locks/unlocks the door 13, a door drive mechanism 14 (including a motor and the like (not illustrated)) that automatically closes the door 13, and a display 15. The storing chamber 12 is provided in the main body 11. When the door 13 is closed (that is, the open space 11a is closed by the door 13), the user cannot pick up the product from the storing chamber 12. Incidentally, the products stored in the storing chamber 12 are not particularly limited, and examples thereof include food, drinks, daily necessities, and miscellaneous goods.

The door 13 is formed of, for example, a transparent glass material, and thus the user can see each product displayed on a shelf 12a in the storing chamber 12 even when the door 13 is closed. The door 13 is mounted to an end edge of the open space 11a of the main body 11 with the hinge mechanism so as to be opened or closed. Moreover, when the door 13 is locked by the lock/unlock mechanism (i.e., when the door 13 is in a locked state), the user may not open the door 13. On the other hand, when the door 13 is unlocked, the user may operate a handle 13a provided on the door 13 to open the door 13, as illustrated on the right of FIG. 2. The display 15 is mounted, for example, on an inner surface (e.g., a glass surface) of the door 13 of the vending machine 1. The display 15 displays (displays and outputs) the product information of the product picked up from the storing chamber 12 by the user. Incidentally, the product information of the product picked up from the storing chamber 12 by the user may be output by voice.

Figure 3:
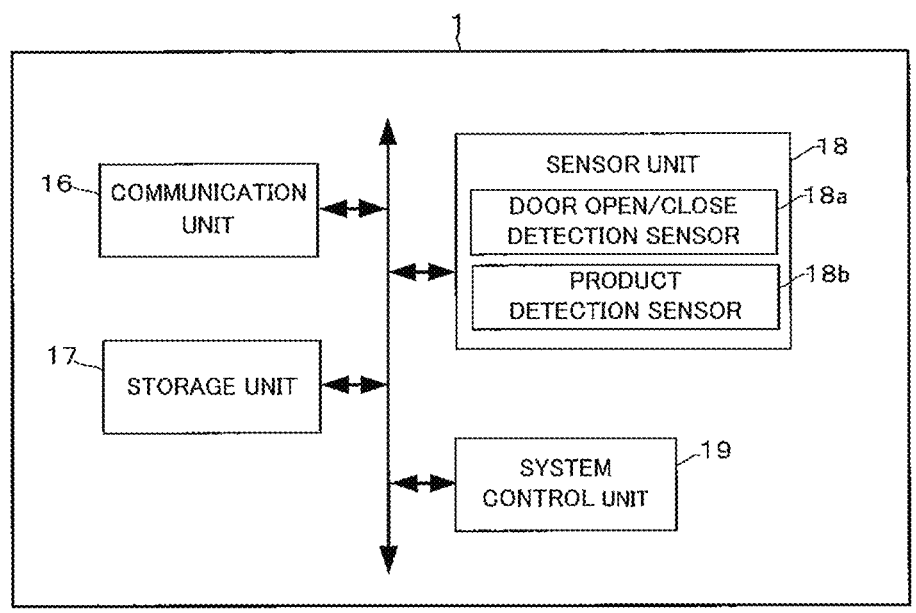
FIG. 3 is a diagram illustrating a functional configuration example of the vending machine 1.

FIG. 3 is a diagram illustrating a functional configuration example of the vending machine 1. As illustrated in FIG. 3, the vending machine 1 includes a communication unit 16, a storage unit 17, a sensor unit 18, a system control unit 19, and the like. Incidentally, the vending machine 1 may be provided with a speaker or the like for outputting voice. Moreover, the vending machine 1 may be provided with a reader that reads a two-dimensional code such as a QR code (registered trademark). Moreover, the communication unit 16 performs control of communication performed via a communication network NW and control of short-range wireless communication performed with the mobile terminal 3. The storage unit 17 is composed of, for example, a hard disk drive or the like, and stores a vending machine processing program or the like. The storage unit 17 stores a vending machine ID (identification information of the vending machine 1) of the vending machine 1. Moreover, the storage unit 17 stores the product information of the product stored in the storing chamber 12. Here, the product information includes information, for example, a product ID (product identification information) of a product, a product name (product name), a product specification, a product selling price (unit price), a product weight, and the number of products in stock, and a photographic image of a product. Here, the selling price (unit price) is an example of the price. Incidentally, the same product ID is assigned to the same product (for example, a duplicate product having the same manufacturer, name, specifications, etc.). Therefore, the number of products to which the same product ID is assigned in the storing chamber 12 is the number of products in stock.

Moreover, the product ID of the product reserved by the user is associated with reservation information including a UID of the user who reserved the product, the number of reserved products, and the like, and is stored in the storage unit 17. Here, a product reserved by a user is referred to as a "reserved product", and a user who has reserved the product is referred to as a "reservation person". Incidentally, in the vending machine 1, the attributes of reserved products are managed as reserved products, and the attributes of unreserved products are managed as normal products. The user can reserve, for example, a limited number of limited edition products, newly launched new products, or well-selling (popular) products on the market before going to the store. Reserving a product means reserving the receipt of the product (that is, the receipt from the vending machine 1). The reservation of the product does not matter whether the settlement processing of the product is completed (that is, the payment is completed). That is, even when the settlement processing of the product is completed, the reservation of the product is continued unless the receipt of the product from the vending machine 1 is completed. Here, the completion of the settlement processing of the product can also be said to be the purchase of the product. Incidentally, the user can also cancel the reserved product. When the reservation is canceled, the attribute of the product to be canceled in the vending machine 1 is changed from the reserved product to the normal product.

The sensor unit 18 includes a door open/close detection sensor 18a, a product detection sensor 18b, and the like. The door open/close detection sensor 18a is a sensor for detecting the open/close of the door 13 of the vending machine 1. The door open/close detection sensor 18a is attached to, for example, the boundary portion between the main body 11 and the door 13. The door open/close detection sensor 18a outputs an opening signal (ON signal) to the system control unit 19 when the door 13 is open (open state), and outputs a closing signal (OFF signal) to the system control unit 19 when the door 13 is closed (closed state). As a result, the system control unit 19 can detect the opening or closing of the door 13 of the vending machine 1.

The product detection sensor 18b is a sensor for detecting a product picked up from the storing chamber 12 of the vending machine 1 or detecting a product returned after being picked up. The product detection sensor 18b may be a camera or a weight sensor. When the product detection sensor 18b is a camera, the product detection sensor 18b is attached near the open space 11a in the main body 11. In this case, the product detection sensor 18b outputs image data in a range continuously captured by the camera to the system control unit 19. This range is the range in which the open space 11a and the storing chamber 12 of the vending machine 1 are fitted. As a result, the system control unit 19 can detect the product that has been picked up or the product that has been returned after being picked up, on the basis of the image data.

On the other hand, when the product detection sensor 18b is a weight sensor, the product detection sensor 18b is attached to the place where the product is placed in the storing chamber 12 (in the example of FIG. 2, a shelf 12a of the storing chamber 12). In this case, the product detection sensor 18b outputs the weight data continuously detected by the weight sensor to the system control unit 19. As a result, the system control unit 19 can detect the product that has been picked up or the product that has been returned after being picked up, on the basis of the weight data.

Incidentally, the sensor unit 18 may include a biological information acquisition sensor capable of acquiring the biological information of the user. The biological information is information indicating a feature amount of a face, fingerprint, palm print, vein, or iris. When the biological information acquisition sensor is a face sensor composed of a camera, the face sensor is attached to an inner surface (for example, a glass surface or a display 15) of the door 13 so that the user's face image can be acquired. When the biological information acquisition sensor is a fingerprint sensor, the fingerprint sensor is attached to a handle 13a of the door 13 so that the user's fingerprint can be acquired. Moreover, when the user detection sensor 18a is an iris sensor, the iris sensor is attached to the inner surface of the door 13 like the face sensor so that the user's iris can be acquired. Then, the biological information acquisition sensor outputs the biological information acquired to the extent that a person can be identified to the system control unit 19.

Figure 4:
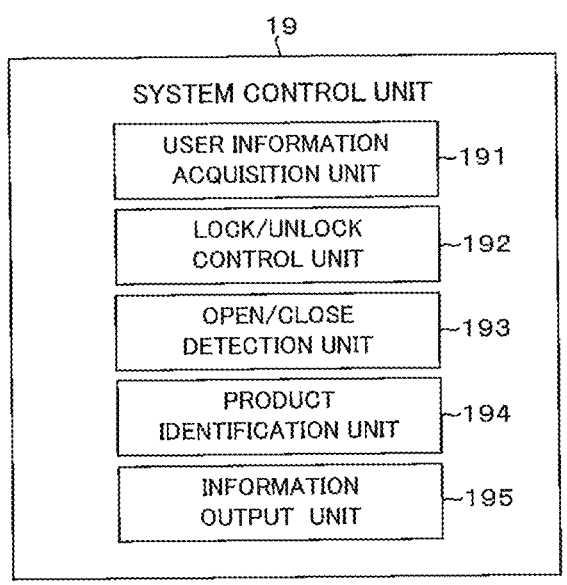
FIG. 4 is a diagram illustrating a functional configuration example of a system control unit 19.

The system control unit 19 (example of computer) includes a CPU (Central Processing Unit), a ROM (Read Only Memory), a RAM (Random Access Memory), and the like. FIG. 4 is a diagram illustrating a functional configuration example of the system control unit 19. As illustrated in FIG. 4, the system control unit 19 (processor in the system control unit 19) functions as a user information acquisition unit 191, a lock/unlock control unit 192, an open/close detection unit 193, a product identification unit 194, an information output unit 195, and the like, for example, by executing a vending machine processing program stored in the storage unit 17. Here, the user information acquisition unit 191 is an example of an information acquisition unit. The lock/unlock control unit 192 is an example of an unlocking control unit. The information output unit 195 is an example of an output unit.

The user information acquisition unit 191 acquires user information on a user who is about to open the door 13 while the door 13 of the vending machine 1 is locked. Such user information includes, for example, a UID of the user. For example, when a user who owns the mobile terminal 3 enters the vicinity range of the vending machine 1 (for example, a range of several meters capable of short-range wireless communication), and thereby the short-range wireless communication is established between the vending machine 1 and the mobile terminal 3, the user information is transmitted from the mobile terminal 3 to the vending machine 1 by the short-range wireless communication. As a result, the user information acquisition unit 191 acquires user information on the user who is about to open the door 13. Incidentally, the authentication request including the user information acquired by the user information acquisition unit 191 is transmitted to the management server 2. The user information included in the authentication request is used in authentication processing for authenticating the user. When the user is authenticated in the authentication processing, an unlock command is transmitted from the management server 2 to the vending machine 1.

As another example, a two-dimensional code such as a QR code (registered trademark) having user information including a user's UID may be displayed on the display of the mobile terminal 3. In this case, the two-dimensional code displayed on the display of the mobile terminal 3 is read by the reader of the vending machine 1. As a result, the user information acquisition unit 191 acquires the user information on the user. Alternatively, the user information acquisition unit 191 may acquire the user information from, for example, a card-type recording medium (for example, an IC card) that records the user information including the UID of the user. Alternatively, the user information acquisition unit 191 may acquire the biological information acquired by the biological information acquisition sensor as the user information on the user.

The lock/unlock control unit 192 performs control to lock/unlock the door 13. For example, the lock/unlock control unit 192 performs control to unlock the door 13 by outputting an unlock control signal to the lock/unlock mechanism when an unlock command is received from the management server 2. On the other hand, the lock/unlock control unit 192 performs control to lock the door 13 by outputting a lock control signal to the lock/unlock mechanism when a lock command is received from the management server 2. The open/close detection unit 193 detects the opening of the door 13 of the vending machine 1 (detects the open state) on the basis of the opening signal input from the door open/close detection sensor 18a. Here, the open state of the door 13 may be detected when the duration of the opening signal is equal to or longer than a predetermined time. Moreover, the open/close detection unit 193 detects the closing of the door 13 of the vending machine 1 (detects the closed state) on the basis of the closing signal input from the door open/close detection sensor 18a. Here, the closed state of the door 13 may be detected when the duration of the closing signal is equal to or longer than a predetermined time. Incidentally, the door opening information indicating the opening detected by the open/close detection unit 193 or the door closing information indicating the closing is transmitted to the management server 2.

The product identification unit 194 detects a product picked up from the storing chamber 12 by the user after the opening of the door 13 is detected or a product returned after being picked up from the storing chamber 12 on the basis of the image data input from the product detection sensor 18b, and identifies it by image recognition. Here, machine learning (AI) is preferably used for image recognition. In this case, the product identification unit 194 identifies a product from the image data input from the product detection sensor 18b by using a trained model in which the characteristics of the image data are learned for each label on the basis of the combination of a large number of pieces of image data and labels (information on what the image data represents).

Alternatively, the product identification unit 194 may detect a product picked up from the storing chamber 12 through the open space 11a or a product returned after being picked up from the storing chamber 12 on the basis of the weight data input from the product detection sensor 18b, and identify it by the weight change. In this case, the product identification unit 194 stores arrangement information of the product on the shelf 12a (that is, information indicating which product is in which position) in advance, and identifies the picked-up product or the returned product by identifying the product placed at the position where the weight has changed on the shelf 12a on the basis of the weight data from the arrangement information. Incidentally, the product information indicating the product (the picked-up product or the returned product) identified by the product identification unit 194 is transmitted to the management server 2.

When the product picked up from the storing chamber 12 is identified by the product identification unit 194, the information output unit 195 outputs the product information (for example, the name and the selling price) of the identified product. Here, when the reserved product is included in the one or more products identified by the product identification unit 194, the information output unit 195 outputs different information depending on whether or not a user (that is, an authenticated user) who has opened the door 13 and picked up the reserved product from the storing chamber 12 is a reservation person of the reserved product. For example, either the product information for the reservation person or the product information for a person other than the reservation person is output depending on whether or not the authenticated user is the reservation person of the reserved product. Incidentally, either one of the product information for the reservation person and the product information for the person other than the reservation person may be displayed and output on the display 15 (screen), or may be output as voice from the speaker (both or one of display output and voice output may be performed).

FIG. 5 is a diagram illustrating a display example of product information for the reservation person of the reserved product. In the example of FIG. 5, among a plurality of products picked up from the storing chamber 12, the character "reserved" indicating that the product is a reserved product is displayed near the names of the reserved products I1 and I4 (may be highlighted with a mark or the like instead of the character). Further, in the example of FIG. 5, "0 yen" is displayed as the selling price and subtotal (an example of "price") of the reserved products I1 and I4. Here, "0 yen" is an example of information indicating zero (monetary unit differs depending on the country), and means that the settlement processing of the reserved product has been completed. This makes it possible to make the user effectively understand that the product picked up by the user is the reserved product of the user and the settlement is completed. Alternatively, in this case, instead of the information indicating zero (or along with the information indicating zero), information indicating that settlement of the reserved product has been completed may be displayed. Incidentally, the normal price may be displayed as the selling price, and "0 yen" may be displayed as the subtotal.

On the other hand, although not shown, if the authenticated user is a reservation person of the reserved product but the settlement processing of the reserved product has not been completed yet, the characters, marks, or the like to indicate the reserved product are displayed, and also the normal price (for example, fixed price or discounted price) is displayed as the selling price of the reserved product near the names of the reserved products I1 and I4. Incidentally, in FIG. 5, since the products I2, I3, and I5 are products that have not been reserved by the reservation person of the reserved products I1 and I4, a normal price (for example, a fixed price, or discounted price) is displayed as the selling price of the products I2, I3, and I5.

FIG. 6 is a diagram illustrating a display example of product information for a person other than the reservation person of the reserved product. In the example of FIG. 6, "330 yen" is displayed as the selling price and subtotal of the reserved product I1 among the plurality of products picked up from the storing chamber 12. Here, "330 yen" is an example of a normal price. Moreover, in the example of FIG. 6, instead of displaying the selling price and the like of the reserved product I4, warning information indicating that the reserved product I4 cannot be purchased (in this example, the message "This product cannot be purchased. Please return it to the vending machine." is displayed. This makes it possible to make the user effectively understand that the product picked up by the user is a product reserved by another person and cannot be purchased. However, only in the case where the same reserved products are stored in plural numbers in the storing chamber 12, and the reserved products are out of stock in the storing chamber 12 when the reserved products are purchased by a person other than the reservation person of the reserved product (that is, when the reservation person cannot receive the reserved product), the above warning information is displayed. Incidentally, the selling price and the like of the reserved product I4 may be displayed, and warning information indicating that the reserved product I4 cannot be purchased may be displayed.

Figure 7:
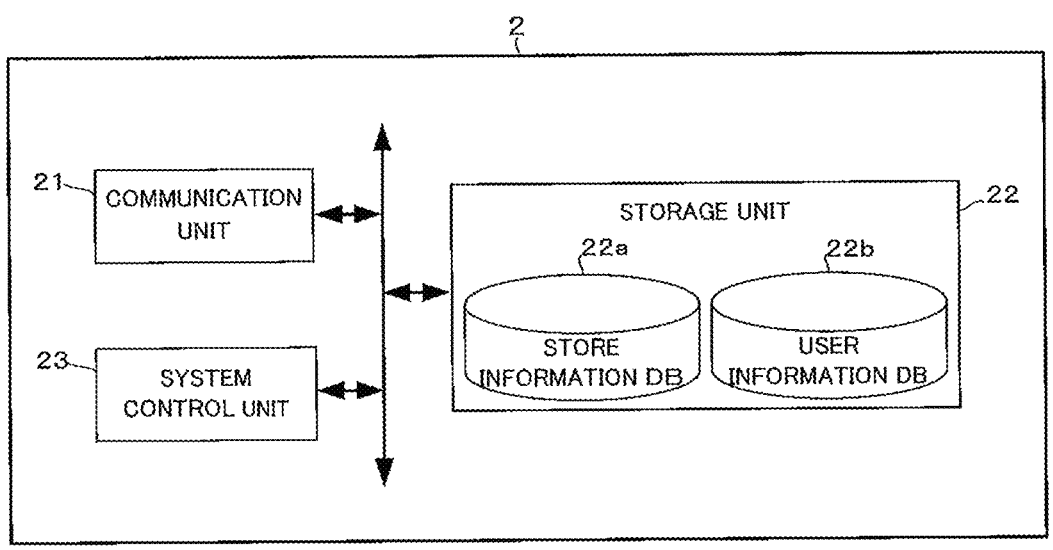
FIG. 7 is a diagram illustrating a functional configuration example of a management server 2.

FIG. 7 is a diagram illustrating a functional configuration example of the management server 2. As illustrated in FIG. 7, the management server 2 includes a communication unit 21, a storage unit 22, and a system control unit 23. The communication unit 21 performs control of communication performed via the communication network NW. The authentication request, door opening information, door closing information, product information, and the like transmitted from the vending machine 1 are received by the communication unit 21. The storage unit 22 is composed of, for example, a hard disk drive or the like, and stores a management server program or the like. Moreover, a store information database (DB) 22a, a user information database (DB) 22b, and the like are constructed in the storage unit 22.

In the store information database 22a, a store ID (store identification information) of the store, a vending machine ID of the vending machine 1 installed in the store, feature information of the vending machine 1, installation location information of the vending machine 1, product information of the products that can be sold by the vending machine 1, an IP address of the vending machine 1, and the like are stored in association with each store. Here, the feature information of the vending machine 1 is an example of information that can identify the vending machine 1 by a person from the outside, and the feature information includes the name, form (color, shape), etc. of the vending machine 1. The installation location information of the vending machine 1 indicates where the vending machine 1 is installed (for example, the eastern end of the first floor of the store).

Moreover, the products that can be sold by the vending machine 1 include the products stored in the storing chamber 12 of the vending machine 1 (that is, the products that are in stock in the storing chamber 12) and the products that are not stored in the vending machine 1 (that is, the products that are not in stock in the storing chamber 12). The product information of such products includes, for example, a product ID of the product, a name of the product, specifications of the product, attributes of the product (for example, reserved product or normal product), a selling price (unit price) of the product, weight of the product, and the number of products in stock. Incidentally, when a plurality of vending machines 1 are installed in one store, the vending machine ID, feature information, installation location information, product information, etc. of each vending machine 1 are stored.

In the user information database 22*b*, a UID, password, name, telephone number, e-mail address, registered biological information, information for settlement, etc. of a user for whom the account was created are stored in association with each user. Here, the user's UID is used for the user's authentication processing (ID authentication). The registered biological information is information indicating the feature amount of the face, fingerprint, palm print, vein, or iris acquired in advance from the user. The registered biological information is used for user authentication processing (biometric authentication such as face authentication, fingerprint authentication, palm print authentication, vein authentication, iris authentication, or the like). Incidentally, when ID authentication is performed in the authentication processing, the registered biological information does not have to be stored in the user information database 22*b*.

Moreover, the information for settlement is information used for settlement processing of the product purchased by the user. The information for settlement includes information according to the settlement method specified in advance by the user. Examples of available settlement methods include credit card settlement, UID settlement (for example, smartphone settlement), electronic money settlement, immediate withdrawal settlement, point settlement, and the like. If the available settlement method is credit card settlement, the information for settlement includes credit card number, name, expiration date, credit limit (credit line), available amount (credit limit amount minus current month's usage amount), and account information, etc. When the available settlement method is UID settlement, the information for settlement includes the information of the settlement method (for example, electronic money settlement, immediate withdrawal settlement, credit card settlement) associated with the payment source (for example, electronic money card number, debit card number, credit card number), and maximum amount, etc.

Moreover, when the available settlement method is electronic money settlement, the information for settlement includes information such as an electronic money card number and an electronic value balance. If the available settlement method is immediate withdrawal settlement, debit card number, name, expiration date, balance of deposit (an example of settlement means owned by the user), account information, and the like are included. When the available settlement method is point settlement, the information for settlement includes information such as a point card number and the balance of points (an example of settlement means owned by the user). Here, the point has a monetary value equivalent to that of money (money) or electronic money. Incidentally, the user's information for settlement may be managed by a server corresponding to the settlement method (for example, a credit card settlement processing server, an electronic money settlement processing server, an immediate withdrawal settlement processing server, a point settlement processing server, etc.). In this case, the management server 2 communicates with the server according to the settlement method as necessary, and acquires the information for settlement of the user.

Figure 8:
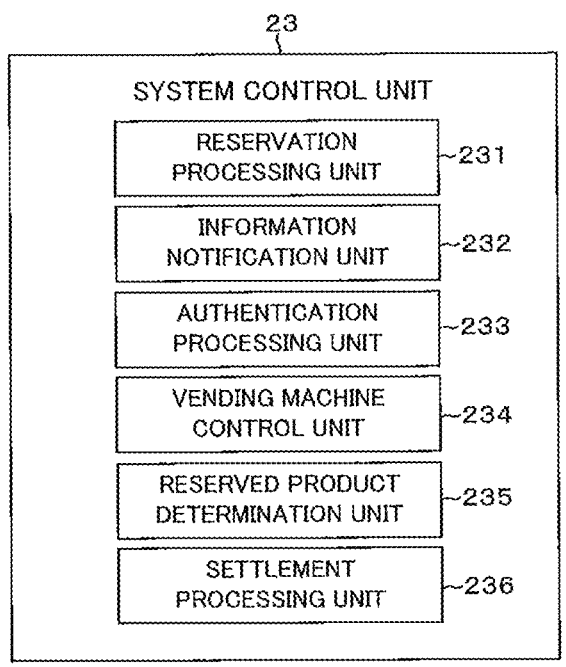
FIG. 8 is a diagram illustrating a functional configuration example of a system control unit 23.

The system control unit 23 (an example of a computer) includes a CPU, a ROM, a RAM, and the like. FIG. 8 is a diagram illustrating a functional configuration example of the system control unit 23. Incidentally, the system control unit 23 recognizes an opening/closing state of the door 13 on the basis of the door opening information or the door closing information received from the vending machine 1. Moreover, the system control unit 23 recognizes the product picked up from the storing chamber 12 of the vending machine 1 or the product returned to the storing chamber 12 on the basis of the product information received from the vending machine 1.

Further, as illustrated in FIG. 8, the system control unit 23 (processor in the system control unit 23), for example, by executing the management server program stored in the storage unit 22, functions as a reservation processing unit 231, an information notification unit 232, an authentication processing unit 233, a vending machine control unit 234, a reserved product determination unit 235, a settlement processing unit 236, and the like. Here, the information notification unit 232 is an example of the notification unit. The vending machine control unit 234 performs control to lock/unlock the door 13 in cooperation with the lock/unlock control unit 192 of the vending machine 1. The reserved product determination unit 235 is an example of the determination unit. Incidentally, the system control unit 23 may perform control to automatically close the door 13 by outputting a closing control signal to the door drive mechanism 14 when the door 13 is kept open for a predetermined time or longer.

The reservation processing unit 231 receives a reservation request for a product specified by the user on a commercial transaction site (for example, a website provided by the management server 2) on the communication network NW, and registers the product related to the reservation request as a reserved product (that is, registers the attribute of the product related to the reservation request as a reserved product). For example, the user accesses the commercial transaction site from the mobile terminal 3 (which may be a terminal such as a personal computer used by the user), logs in using the UID and password of the user, and then selects the desired store on the page provided from the commercial transaction site and specifies one or more desired products available for purchase at the selected store. Then, a reservation request including a store ID of the store specified by the user and the product ID of the specified product is transmitted from the mobile terminal 3 to the management server 2. Incidentally, the products that can be searched and selected on the page may include products that are not stored in the storing chamber 12 of the vending machine 1 installed in the store (that is, products that are out of stock). In this case, the reservation processing unit 231 receives a reservation request for a product that is not stored in the storing chamber 12 of the vending machine 1. Moreover, the reservation processing unit 231 can also receive a reservation cancellation request for a product reserved by the user.

The reservation processing unit 231, upon receiving the reservation request, registers it as a reserved product by storing the reservation information including the user's UID and the like in the store information database 22*a* in association with the store ID and the product ID included in the reservation request. Incidentally, the reservation processing unit 231 may register (provisionally register) the product related to the reservation request as a reserved product even if the product related to the reservation request is not stored in the storing chamber 12 of the vending machine 1. Moreover, the reservation processing unit 231 confirms the inventory of the product specified by the user, and in a case where the product is in stock, officially registers the product related to the reservation request as a reserved product, while in a case where the product is out of stock, may provisionally register the product related to the reservation request as a reserved product. Here, the case where the product is out of stock is a case where the product is not stored in the vending machine 1 of the store specified by the user, or a case where the product is stored in the vending machine 1 of the store specified by the user but is reserved by another reservation person (that is, only the products for the other reservation person are stored). Moreover, the reservation processing unit 231, upon receiving the reservation cancellation request, deletes the reservation information of the product related to the reservation cancellation request from the store information database 22a, and changes the attribute of the product from the reserved product to the normal product.

Incidentally, the reservation processing unit 231 performs the settlement processing of the product related to the reservation request on the basis of the information for settlement of the user who made the reservation request, and when the settlement processing is completed (normally ended), may register the product related to the reservation request as a reserved product. In this settlement processing, payment processing of an amount corresponding to the price of the product (that is, processing of imposing the payment of the amount on the user) is performed according to the settlement method included in the information for settlement of the user. Alternatively, the reservation processing unit 231, in a case of determining whether or not the user has the ability to pay on the basis of the information for the information for settlement of the user who made the reservation request and determining that the user has the ability to pay, may register the product related to the reservation request as a reserved product. In this case, the settlement processing of the product related to the reservation request is not performed at the stage of receiving the reservation request, and the settlement processing is performed at the stage where the product is picked up from the vending machine 1. Incidentally, when credit card settlement is specified as the settlement method of the user, it is determined that the user has the ability to pay when the available amount is equal to or higher than the predetermined price. Alternatively, when electronic money settlement is specified as the settlement method of the user, it is determined that the user has the ability to pay when the balance of the electronic value is equal to or higher than the predetermined price (predetermined amount).

The information notification unit 232, when the reserved product is registered in response to the reservation request, notifies at least one of the feature information and the installation location information of the vending machine 1 in which the reserved product is stored to the user (reservation person) who made the reservation request. As a result, the user can quickly identify the vending machine 1 that stores the reserved product. For example, the information notification unit 232 transmits at least one of the feature information and the installation location information of the vending machine 1 in which the reserved product is stored to the user's mobile terminal 3, thereby notifying the user of the information. Alternatively, the information notification unit 232 transmits an e-mail indicating at least one of the feature information and the installation location information of the vending machine 1 in which the reserved product is stored to the user's e-mail address, thereby notifying the user of the information.

Moreover, in a case where a product that is out of stock is registered as a reserved product in response to a reservation request, the information notification unit 232 notifies the user (reservation person) who made the reservation request of information on the scheduled date and time on which the reserved product is stored in the vending machine 1 (for example, a message "It will be stored in the vending machine on x-month, x-day in 2020"). As a result, the reservation person can efficiently adjust the schedule for picking up the reserved product in advance. In this case as well, the information notification unit 232 transmits the information on the scheduled date and time to the user's mobile terminal 3 or transmits an e-mail indicating the information to the user's e-mail address, thereby notifying the user of the information.

Further, in a case where the product registered as the reserved product (that is, the product out of stock) is stored in the storing chamber 12 of the vending machine 1, the information notification unit 232 preferably notifies the user (reservation person) who made the reservation request of the information indicating that the reserved product is stored in the vending machine 1. This makes it possible for the reservation person to go timely to pick up the reserved product. In this case as well, the information notification unit 232 transmits the information indicating that the reserved product is stored in the vending machine 1 to the user's mobile terminal 3 or transmits an e-mail indicating the information to the user's e-mail address, thereby notifying the user of the information. Incidentally, the information notification unit 232 may notify, together with the information indicating that the reserved product is stored in the vending machine 1, at least one of the feature information and the installation location information of the vending machine 1 in which the reserved product is stored.

The authentication processing unit 233 performs authentication processing to authenticate the user when an authentication request including user information on a user (reservation person or a person other than the reservation person) who is about to open the door 13 in a state where the door 13 of the vending machine 1 is locked is received from the vending machine 1. Here, in the authentication processing when the UID is included in the authentication request as the user information, it is determined whether or not the UID included in the authentication request is stored in the user information database 22b (that is, ID authentication is performed). Then, when the UID is stored in the user information database 22b (in other words, when the UID included in the authentication request matches the UID stored in the user information database 22b), the user is authenticated (identified). Incidentally, in the authentication processing when biological information is included in the authentication request as the user information, it is determined whether or not the registered biological information whose degree of matching with the biological information included in the authentication request is equal to or higher than a threshold value is stored in the user information database 22b (that is, biometric authentication is performed). Then, when the registered biological information whose degree of matching with the biological information is equal to or higher than the threshold value is stored in the user information database 22b, the user is authenticated.

The vending machine control unit 234 transmits an unlock command for the door 13 of the vending machine 1 to the vending machine 1 when the user is authenticated by the authentication processing unit 233. That is, the vending machine control unit 234 performs control to unlock the door 13 of the vending machine 1. Moreover, when the closing of the door 13 of the vending machine 1 is detected, the vending machine control unit 234 transmits a lock command for the door 13 to the vending machine 1. That is, the vending machine control unit 234 performs control to lock the door 13 of the vending machine 1.

The reserved product determination unit 235 determines whether or not the reserved product is included in one or more products that are picked up from the storing chamber 12 after the door 13 of the vending machine 1 is unlocked, and identified (that is, the product identified by the product identification unit 194). For example, if there is a product in which the reservation information is associated with the product ID among the identified products, it is determined that the reserved product is included. The reserved product determination unit 235, when determining that the reserved product is included in the identified products, transmits the product ID of the reserved product and the reservation information thereof to the vending machine 1. As a result, in the vending machine 1, different product information (both or one of display output and voice output) is output depending on whether or not the authenticated user is the reservation person of the reserved product.

The settlement processing unit 236 performs settlement processing of the picked-up product on the basis of the information for settlement of the user authenticated by the authentication processing unit 233 when the closing of the door 13 is detected after the product picked up from the storing chamber 12 of the vending machine 1 is identified (excluding the settlement processing of the reserved product for which the settlement processing has been completed at the time of reservation).

[2. Operation of Vending Machine Control System S]

Next, the operation of the vending machine control system S will be described.

(2.1. Processing of Vending Machine 1)

Figure 9:
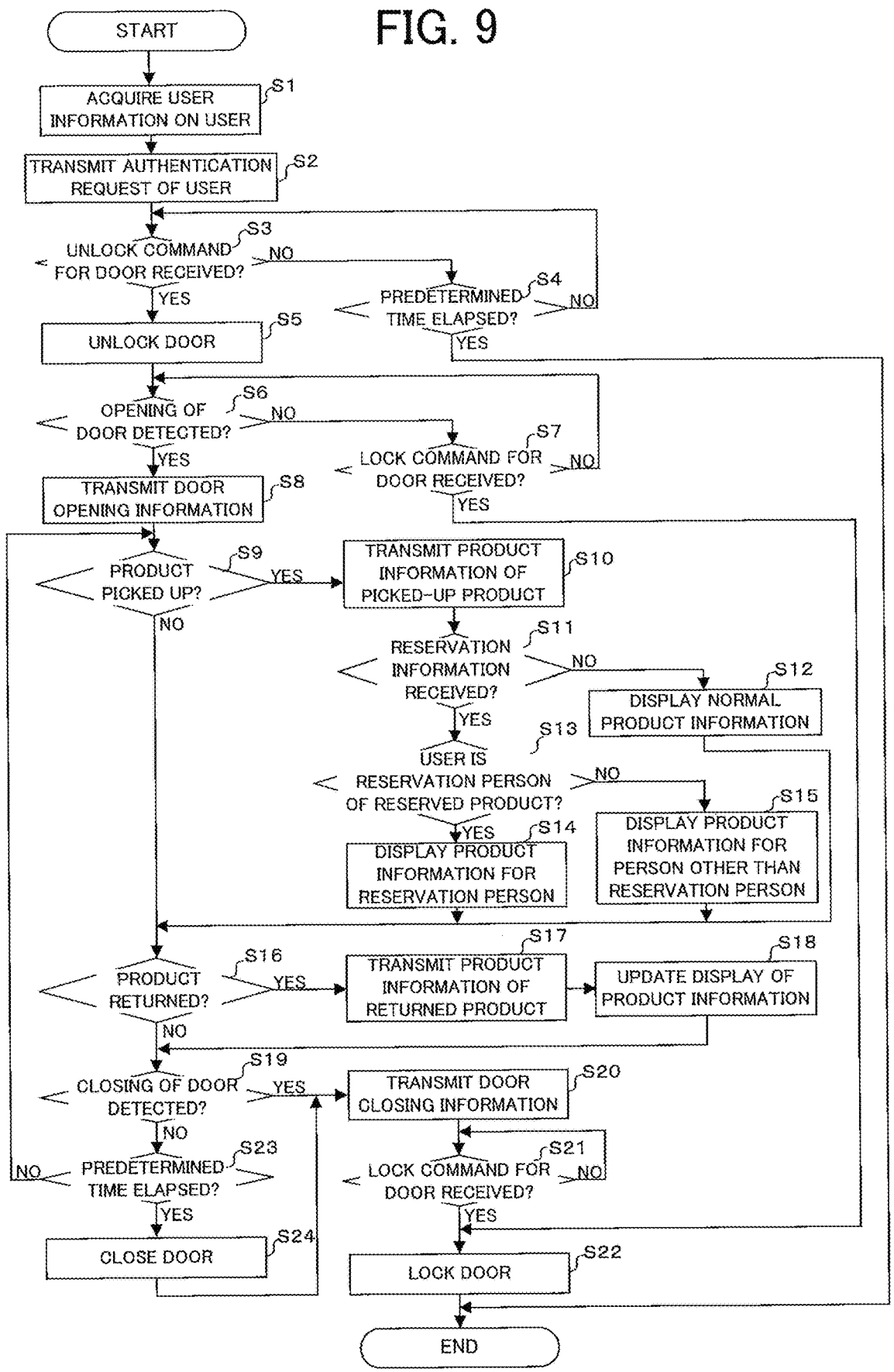
FIG. 9 is a flowchart showing an example of processing of the system control unit 19 in the vending machine 1.

First, the processing of the system control unit 19 in the vending machine 1 will be described with reference to FIG. 9. FIG. 9 is a flowchart showing an example of processing of the system control unit 19 in the vending machine 1. For example, when a user who owns the mobile terminal 3 enters the vicinity range of the vending machine 1 (for example, a range of several meters capable of short-range wireless communication), and thereby the short-range wireless communication is established between the vending machine 1 and the mobile terminal 3, the processing shown in FIG. 9 is started. Alternatively, when the user who owns the mobile terminal 3 puts a two-dimensional code displayed on the display of the mobile terminal 3 over the reader of the vending machine 1, and the reader reads the two-dimensional code, the processing shown in FIG. 9 is started.

When the processing shown in FIG. 9 is started, the system control unit 19 acquires user information on the user who owns the mobile terminal 3 (that is, the user who is about to open the door 13) (step S1). Next, the system control unit 19 transmits an authentication request including the user information (including, for example, the user's UID or biological information) acquired in step S1 and the vending machine ID of the vending machine 1 to the management server 2 via the communication network NW (step S2) and waits for a response from the management server 2. At this time, the system control unit 19 activates a timer A1. Incidentally, the authentication request including the user information and the vending machine ID may be transmitted from the mobile terminal 3 to the management server 2 via the communication network NW. In this case, the vending machine ID is transmitted from the vending machine 1 to the mobile terminal 3 by short-range wireless communication.

Next, the system control unit 19 determines whether or not the unlock command for the door 13 has been received from the management server 2 (step S3). If the unlock command for the door 13 has not been received (step S3: NO), the process proceeds to step S4. On the other hand, if the unlock command for the door 13 has been received by authenticating the user by the authentication processing of the management server 2 (step S3: YES), the process proceeds to step S5. Here, the unlock command may be received together with the UID of the authenticated user.

In step S4, the system control unit 19 determines whether or not a predetermined time has elapsed since the transmission of the authentication request. For example, when the time set by the timer A1 (for example, about several tens of seconds) counts up, it is determined that the predetermined time has elapsed (step S4: YES), and the process ends. That is, if the management server 2 determines that the user has not been authenticated, the door 13 is not unlocked. On the other hand, if it is determined that the predetermined time has not elapsed (step S4: NO), the process returns to step S3.

In step S5, the system control unit 19 performs control to unlock the door 13 by outputting an unlocking control signal to the lock/unlock mechanism. Next, the system control unit 19 determines whether or not the opening of the door 13 has been detected (step S6). If the opening of the door 13 is not detected (step S6: NO), the process proceeds to step S7. On the other hand, when the authenticated user opens the door 13 by operating the handle 13*a* provided on the door 13, the opening of the door 13 is detected (step S6: YES), and the process proceeds to step S8. At this time, the system control unit 19 activates a timer A2.

In step S7, the system control unit 19 determines whether or not a lock command for the door 13 has been received from the management server 2. If the lock command for the door 13 has not been received (step S7: NO), the process returns to step S6. On the other hand, if the lock command for the door 13 has been received (step S7: YES), the process proceeds to step S22. In step S8, the system control unit 19 transmits the door opening information indicating the opening of the door 13 to the management server 2 via the communication network NW.

Next, the system control unit 19 determines whether or not the product has been picked up from the storing chamber 12 by the user (step S9). If it is determined that the product has been picked up from the storing chamber 12 (step S9: YES), the process proceeds to step S10. In step S10, the picked-up product is identified by image recognition, the product information of the identified product is transmitted to the management server 2 via the communication network NW, and the process proceeds to step S11. On the other hand, when it is determined that the product has not been picked up by the user from the storing chamber 12 (step S9: NO), the process proceeds to step S16.

In step S11, the system control unit 19 determines whether or not the product ID of the reserved product and the reservation information thereof have been received from the management server 2. If the product ID of the reserved product and the reservation information thereof have not been received from the management server 2 for a predetermined time (or information indicating that there is no reservation information has been received) (step S11: NO), normal product information related to the picked-up product (e.g., product name and selling price, etc.) is displayed on the display 15 (step S12). On the other hand, if the product ID of the reserved product and the reservation information thereof have been received from the management server 2 (step S11: YES), the process proceeds to step S13.

In step S13, the system control unit 19 determines whether or not the authenticated user is the reservation person of the reserved product. For example, if the UID included in the user information acquired in step S1 and the UID included in the reservation information received in step S11 (or the UID received together with the unlock command) match, it is determined that the authenticated user is the reservation person of the reserved product.

Then, when it is determined that the authenticated user is the reservation person of the reserved product (step S11: YES), the system control unit 19, for example, as illustrated in FIG. 5, displays (that is, displays and outputs on the screen) the product information for the reservation person of the reserved product (for example, "0 yen" as a selling price or a subtotal) on the display 15 (step S14). Here, the system control unit 19 may output the product information for the reservation person of the reserved product by voice from the speaker, and in this case, the product information may not be displayed and output on the screen.

On the other hand, when it is determined that the authenticated user is not the reservation person of the reserved product (that is, a person other than the reservation person) (step S11: NO), the system control unit 19, for example, as illustrated in FIG. 6, displays product information (for example, a fixed price as a selling price) for a person other than the reservation person of the reserved product on the display 15 (step S15). Incidentally, the product information for a person other than the reservation person of the reserved product may be warning information indicating that the reserved product cannot be purchased. Here, the system control unit 19 may output warning information indicating that the reserved product cannot be purchased by voice from the speaker, and in this case, the warning information may not be displayed and output on the screen.

In step S16, the system control unit 19 determines whether or not the product picked up by the user has been returned to the storing chamber 12. When it is determined that the picked-up product has been returned to the storing chamber 12 (step S16: YES), the returned product is identified by image recognition, and the product information of the identified product is transmitted to the management server 2 via the communication network NW (step S17). Then, for example, the display of the product information of the returned product is deleted from the display 15, so that the display of the product information is updated (step S18). On the other hand, if it is determined that the product has not been returned to the storing chamber 12 (step S16: NO), the process proceeds to step S19.

In step S19, the system control unit 19 determines whether or not the closing of the door 13 is detected. If the closing of the door 13 is not detected (step S19: NO), the process proceeds to step S23. On the other hand, when the user closes the door 13 in order to proceed to the settlement processing of the product after confirming the selling price and the like of the picked-up product on the display 15, the closing of the door 13 is detected (step S19: YES), and the process proceeds to step S20.

In step S20, the system control unit 19 transmits the door closing information indicating the closing of the door 13 to the management server 2 via the communication network NW. Next, the system control unit 19 determines whether or not a lock command for the door 13 has been received from the management server 2 (step S21). If the lock command for the door 13 has not been received (step S21: NO), the process returns to step S21. On the other hand, if the lock command for the door 13 has been received (step S21: YES), the process proceeds to step S22. In step S22, the system control unit 19 performs control to lock the door 13 by outputting a locking control signal to the lock/unlock mechanism, and ends the processing.

In step S23, the system control unit 19 determines whether or not a predetermined time has elapsed since the door 13 was opened. For example, when the time set by the timer A2 (for example, about several minutes) counts up, it is determined that a predetermined time has elapsed (that is, the door 13 has been opened for a predetermined time or longer) (step S23: YES), and the process proceeds to step S24. On the other hand, if it is determined that the predetermined time has not elapsed (step S23: NO), the process returns to step S9. In step S24, the system control unit 19 performs control to close the door 13 by outputting a closing control signal to the door drive mechanism 14. After that, the process transits to step S20, and the door closing information indicating the closing of the door 13 is transmitted to the management server 2.

(2.2. Processing of Management Server 2)

Figure 10:
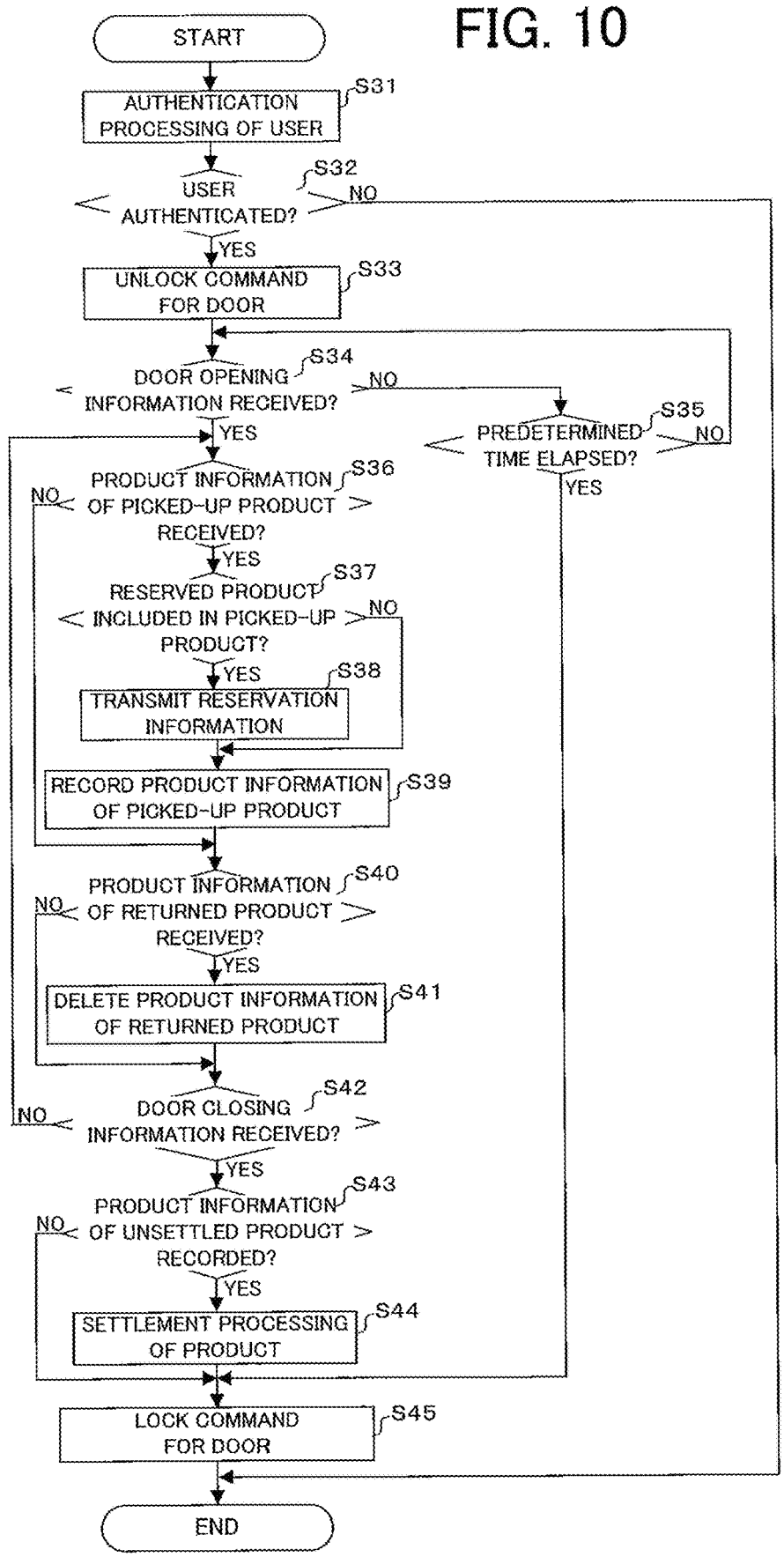
FIG. 10 is a flowchart showing an example of processing of the system control unit 23 in the management server 2.

Next, the processing of the system control unit 23 in the management server 2 will be described with reference to FIG. 10. FIG. 10 is a flowchart showing an example of processing of the system control unit 23 in the management server 2. The processing shown in FIG. 10 is started when the authentication request from the vending machine 1 is received through the communication unit 21.

When the processing shown in FIG. 10 is started, the system control unit 23 performs authentication processing for authenticating the user on the basis of the user information included in the received authentication request (step S31). In this authentication processing, as described above, ID authentication or biometric authentication is performed. Next, the system control unit 23 of the management server 2 determines whether or not the user has been authenticated by the authentication processing in step S31 (step S32). If the user is authenticated (step S32: YES), the process proceeds to step S33. On the other hand, if the user is not authenticated (step S32: NO), the process ends.

In step S33, the system control unit 23 transmits an unlock command for the door 13 to the vending machine 1 via the communication network NW, and waits for a response from the vending machine 1. At this time, the system control unit 23 activates a timer A3. The unlock command transmitted in this way is received in the above step S3 of the processing of the vending machine 1. As a result, the door 13 of the vending machine 1 is unlocked.

Next, the system control unit 23 determines whether or not the door opening information has been received from the vending machine 1 (that is, whether or not the opening of the door 13 has been detected) (step S34). If the door opening information has not been received (step S34: NO), the process proceeds to step S35. On the other hand, if the door opening information has been received (step S34: YES), the process proceeds to step S36.

In step S35, the system control unit 23 determines whether or not a predetermined time has elapsed from the transmission of the unlock command for the door 13. For example, when the time set by the timer A3 (for example, about several tens of seconds) counts up, it is determined that the predetermined time has elapsed (step S35: YES), and the process proceeds to step S45. On the other hand, if it is determined that the predetermined time has not elapsed (step S35: NO), the process returns to step S34.

In step S36, the system control unit 23 determines whether or not the product information of the product picked up from the storing chamber 12 of the vending machine 1 has been received from the vending machine 1. If the product information of the picked-up product has not been received (step S36: NO), the process proceeds to step S40. On the other hand, if the product information of the picked-up product has been received (step S36: YES), the process proceeds to step S37.

In step S37, the system control unit 23 determines whether or not the reserved product is included in the product picked up from the storing chamber 12 of the vending machine 1 (that is, the product picked up from the storing chamber 12 and identified). For example, if there are a plurality of picked-up products, the reserved product determination unit 235 determines whether or not all or part of those products are reserved products. Alternatively, if there is only one picked-up product, the reserved product determination unit 235 determines whether or not the product is a reserved product.

Then, when it is determined that the reserved product is included in the picked-up products (for example, there is a product in which the reservation information is associated with the product ID among the picked-up products) (step S37: YES), the process proceeds to step S38. In step S38, the system control unit 23 acquires the reservation information associated with the product ID of the reserved product from the store information database 22a and transmits the acquired reservation information to the vending machine 1 via the communication network NW, and the process proceeds to step S39.

On the other hand, if it is determined that the reserved product is not included in the picked-up products (step S37: NO), the process proceeds to step S39. Incidentally, if it is determined that the reserved product is not included in the picked-up products, information indicating that there is no reservation information may be transmitted to the vending machine 1 via the communication network NW. In step S39, the product information of the picked-up products is recorded, and the process proceeds to step S40. Here, recording the product information means, for example, recording (registering) in a list of products to be settled. Incidentally, when the settlement processing of the reserved product is completed, the reserved product is not recorded in the list of products to be settled.

In step S40, the system control unit 23 determines whether or not the product information of the product returned to the storing chamber 12 of the vending machine 1 has been received from the vending machine 1. If the product information of the returned product has not been received (step S40: NO), the process proceeds to step S42. On the other hand, if the product information of the returned product has been received (step S40: YES), the product information of the returned product is deleted (for example, deleted from the above list) (step S41), and the process proceeds to step S42.

In step S42, the system control unit 23 determines whether or not the door closing information has been received from the vending machine 1 (that is, whether or not the closing of the door 13 has been detected). If the door closing information has not been received (step S42: NO), the process returns to step S36. On the other hand, if the door closing information has been received (step S42: YES), the process proceeds to step S43.

In step S43, the system control unit 23 determines whether or not the product information is recorded (for example, recorded in the above list). If it is determined that the product information is recorded (step S43: YES), the process proceeds to step S44. On the other hand, if it is determined that the product information is not recorded (step S43: NO), the process proceeds to step S45.

In step S44, the system control unit 23 performs the settlement processing of the picked-up product on the basis of the information for settlement of the user authenticated in step S32 and the recorded product information. By this settlement processing, the payment of the amount corresponding to the price of the product is imposed on the user, and the process proceeds to step S45.

In step S45, the system control unit 23 transmits the lock command for the door 13 to the vending machine 1 via the communication network NW, and ends the processing. The locking command transmitted in this way is received in step S21 of the processing of the vending machine 1. As a result, the door 13 of the vending machine 1 is locked.

As described above, according to the above embodiment, the vending machine control system S performs authentication processing for authenticating the user on the basis of the information on the user who is about to open the door 13 of the vending machine 1, and when the user is authenticated, performs control to unlock the door 13 of the vending machine 1. Then, the vending machine control system S identifies the product picked up from the storing chamber 12 after the door 13 is unlocked, and when the reserved product is included in the identified product, outputs different information depending on whether or not the authenticated user is a reservation person of the reserved product. Thus, even if a person other than the reservation person can access the reserved product reserved by the reservation person, it is possible to make a flexible response by distinguishing the reservation person from the person other than the reservation person.

Incidentally, the above embodiment is an embodiment of the present invention, and the present invention is not limited to the above embodiment, and various configurations and the like may be modified from the above embodiment within a range not departing from the gist of the present invention, and the modified ones are also included in the technical scope of the present invention. For example, in the above embodiment, the case where the user who reserved the product picks up the reserved product from the vending machine 1 has been described as an example, but the present invention can also be applied to a case where a delivery person (an example of a user) instead of the reservation person who has reserved the reserved product goes to a store specified by the reservation person and picks up the reserved product from the vending machine 1 installed in the store. In this case, an authentication code (an example of user information on the user) issued by the management server 2 at the time of reservation of the reserved product or the like is transmitted to the mobile terminal owned by the delivery person who is the user and stored therein. This authentication code is associated with the UID of the reservation person who reserved the reserved product and is stored in the management server 2.

Then, when the user who is the delivery person enters the vicinity range of the vending machine 1 and the short-range wireless communication is established between the vending machine 1 and the mobile terminal of the delivery person, the authentication code is acquired by the vending machine 1 through the short-range wireless communication. Alternatively, by putting the two-dimensional code (including the authentication code) displayed on the display of the mobile terminal of the user who is the delivery person over the reader of the vending machine 1, the authentication code is acquired by the vending machine 1. Then, the vending machine 1 transmits an authentication request including the acquired authentication code and the like to the management server 2. As a result, the management server 2 performs authentication processing for authenticating the user who is the delivery person. In this authentication processing, it is determined whether or not the authentication code included in the authentication request is stored in the management server 2. Then, when the authentication code included in the authentication request is stored in the management server 2 (in other words, when the authentication code included in the authentication request matches the authentication code stored in the management server 2), the user is authenticated, and an unlock command is transmitted from the management server 2 to the vending machine 1 (the subsequent processing is the same as in the above embodiment).

Moreover, in the above embodiment, the vending machine 1 may be configured to be accessible to the store information database 22a and the user information database 22b. In this case, the vending machine 1 performs authentication processing for authenticating the user by referring to the user information database 22b, and performs control to unlock the door 13 of the vending machine 1 when the user is authenticated. Then, the vending machine 1 identifies the product picked up from the storing chamber 12, determines whether or not the reserved product is included in the identified product by referring to the store information database 22a, and when the reserved product is included, outputs different information depending on whether or not the authenticated user is the reservation person of the reserved product.

REFERENCE SIGNS LIST

1 Vending machine
2 Management server
3 Mobile terminal
11 Main body
12 Storing chamber
13 Door
14 Door drive mechanism
15 Display
16 Communication unit
17 Storage unit
18 Sensor unit
19 System control unit
191 User information acquisition unit
192 Lock/unlock control unit
193 Open/close detection unit
194 Product identification unit
195 Information output unit
21 Communication unit
22 Storage unit
23 System control unit
231 Reservation processing unit
232 Information notification unit
233 Authentication processing unit
234 Vending machine control unit
235 Reserved product determination unit
236 Settlement processing unit
S Vending machine control system
NW Network

The invention claimed is:

1. A vending machine control system that controls a vending machine including a storing chamber for storing products including a reserved product that is reserved and a door for covering an open space through which a product is picked up from the storing chamber, the vending machine control system comprising:
at least one memory configured to store program code; and
at least one processor configured to access the program code and operate as instructed by the program code, the program code including:
information acquisition code configured to cause the at least one processor to acquire information on a user;
authentication processing code configured to cause the at least one processor to perform authentication processing for authenticating the user on the basis of the acquired information;
unlocking control code configured to cause the at least one processor to perform control to unlock the door of the vending machine when the user is authenticated;
product identification code configured to cause the at least one processor to identify at least one product picked up from the storing chamber after the door is unlocked;
determination code configured to cause the at least one processor to determine whether or not the reserved product is included in the identified product; and
output code configured to cause the at least one processor to output information related to each of the identified at least one product, the information comprising a name, a price, and a quantity of each of the identified at least one product,
wherein the output code is further configured to cause the at least one processor to output, when it is determined that the reserved product is included in the identified at least one product, different indication for information related to at least one of the name, the price, and the quantity of the reserved product depending on whether or not the authenticated user is a reservation person of the reserved product.

2. The vending machine control system according to claim 1, wherein when the authenticated user is the reservation person of the reserved product, the output code causes the at least one processor to output information indicating that settlement of the reserved product has been completed.

3. The vending machine control system according to claim 1, wherein when the authenticated user is the reservation person of the reserved product, the output code causes the at least one processor to output information indicating zero as a price of the reserved product.

4. The vending machine control system according to claim 1, wherein when the authenticated user is a person other than the reservation person of the reserved product, the output code causes the at least one processor to output a normal price as a price of the reserved product.

5. The vending machine control system according to claim 1, wherein when the authenticated user is a person other than the reservation person of the reserved product, the output unit outputs warning information indicating that the reserved product cannot be purchased.

6. The vending machine control system according to claim 5, wherein only when a plurality of the same reserved products are stored in the storing chamber and the reserved products are out of stock in the storing chamber when the reserved products are purchased by a person other than the reservation person of the reserved product, the output code causes the at least one processor to output the warning information.

7. The vending machine control system according to claim 1, the program code further including reservation processing code configured to cause the at least one processor to register, when a reservation request for a product not stored in the storing chamber is received from a terminal used by the user, the product related to the reservation request as a reserved product.

8. The vending machine control system according to claim 7, the program code further including notification code configured to cause the at least one processor to register notify, when the product related to the reservation request is registered as the reserved product, the user of information on a scheduled date and time when the reserved product is stored in the vending machine.

9. The vending machine control system according to claim 7, wherein the notification code causes the at least one processor to notify, when the product registered as the reserved product is stored in the storing chamber, the user of information indicating that the product is stored in the vending machine.

10. The vending machine control system according to claim 9, wherein the notification code causes the at least one processor to notify information that allows a person to identify the vending machine in which the product registered as the reserved product is stored.

11. The vending machine control system according to claim 9, wherein the notification code causes the at least one processor to notify installation location information of the vending machine in which the product registered as the reserved product is stored.

12. The vending machine control system according to claim 1, wherein when the authenticated user is the reservation person of the reserved product, the output code causes the at least one processor to output information indicating a normal price of the reserved product for which a settlement processing has not been completed yet, while outputting information indicating that a subtotal of the reserved product for which a settlement processing has been completed is zero.

13. The vending machine control system according to claim 1, wherein when the authenticated user is the reservation person of the reserved product, the output code causes the at least one processor to output, together with a name of the reserved product, information indicating that a reservation has been made for the reserved product.

14. A vending machine including a storing chamber for storing products including a reserved product that is reserved and a door for covering an open space through which the products are picked up from the storing chamber, the vending machine comprising: at least one memory configured to store program code; and at least one processor configured to access the program code and operate as instructed by the program code, the program code including:
   information acquisition code configured to cause the at least one processor to acquire information on a user;
   authentication processing code configured to cause the at least one processor to perform authentication processing for authenticating the user on the basis of the acquired information;
   unlocking control code configured to cause the at least one processor to perform control to unlock the door of the vending machine when the user is authenticated;
   product identification code configured to cause the at least one processor to identify at least one product picked up from the storing chamber after the door is unlocked; and
   output code configured to cause the at least one processor to output information related to each of the identified at least one product, the information comprising a name, a price, and a quantity of each of the identified at least one product,
   wherein the output code is further configured to cause the at least one processor to output, when the identified at least one product includes the reserved product, different indication for information related to at least one of the name, the price, and the quantity of the reserved product depending on whether or not the authenticated user is a reservation person of the reserved product.

15. An information output method executed by a vending machine including a storing chamber for storing products including a reserved product that is reserved and a door for covering an open space through which the products are picked up from the storing chamber, the information output method including:
   acquiring information on a user;
   performing authentication processing for authenticating the user on the basis of the acquired information;
   unlocking the door of the vending machine when the user is authenticated;
   identifying at least one product picked up from the storing chamber after the door is unlocked; and
   outputting information related to each of the identified at least one product, the information comprising a name, a price, and a quantity of each of the identified at least one product,
   wherein the outputting further includes outputting, when the identified at least one product includes the reserved product, different indication for information related to at least one of the name, the price, and the quantity of the reserved product depending on whether or not the authenticated user is a reservation person of the reserved product.

\* \* \* \* \*